United States Patent [19]

Ayorinde et al.

[11] Patent Number: 5,374,670
[45] Date of Patent: Dec. 20, 1994

[54] BINDERS, METHOD OF MAKING AND USING BINDERS AND STRUCTURES MADE USING BINDERS

[75] Inventors: Ayodeji J. Ayorinde, Lincoln; Harold E. Egger, Hickman; Delmar C. Timm, Lincoln, all of Nebr.

[73] Assignee: The Board of Regents of the University of Nebraska, Lincoln, Nebr.

[21] Appl. No.: 145,028

[22] Filed: Oct. 28, 1993

Related U.S. Application Data

[63] Continuation-in-part of Ser. No. 659,458, Feb. 21, 1991, abandoned, which is a continuation of Ser. No. 503,135, Mar. 30, 1990, abandoned, which is a continuation of Ser. No. 378,429, Jul. 11, 1989, abandoned, which is a continuation of Ser. No. 144,663, Jan. 12, 1988, abandoned, which is a continuation of Ser. No. 712,518, Mar. 18, 1985, abandoned.

[51] Int. Cl.$^5$ .............. C08L 89/00; C08K 11/00; B29C 59/00; B29C 39/14
[52] U.S. Cl. ......................... 524/13; 524/14; 524/15; 524/16; 524/35; 527/200; 264/122; 264/165; 428/105
[58] Field of Search ............. 524/13, 14, 15, 16, 524/35; 527/200; 264/122, 165; 428/105

[56] References Cited

U.S. PATENT DOCUMENTS

| | | | |
|---|---|---|---|
| 1,593,342 | 7/1926 | Meigs | 527/303 |
| 1,812,970 | 7/1931 | Mason | 162/101 |
| 2,109,466 | 3/1938 | Champer et al. | 536/94 |
| 3,405,053 | 10/1968 | Broadhead et al. | 527/105 |
| 4,107,379 | 8/1978 | Stofko | 428/326 |
| 4,496,718 | 1/1985 | Rudy | 536/56 |

FOREIGN PATENT DOCUMENTS 298968 11/1927 United Kingdom .

*Primary Examiner*—Nathan M. Nutter
*Attorney, Agent, or Firm*—Vincent L. Carney

[57] ABSTRACT

To form a binder from naturally occurring products without extraction or purification steps, the binder utilizes proteins from the germ or endosperm of cereal grasses or from the seed of buckwheat, oil seed plants, Amaranthus or leguminous plants or from leaves. The protein has a thermoplastic microstructure with linear polymers of molecular weight of at least 2000 linked with peptide linkages of at least 50 in number. The naturally occurring product is ground or milled without further processing and thus includes carbohydrates, particularly as cellulose, and possibly fats, yeast or materials yielding ash upon burning, with the carbohydrates being at least 5% of the proteins by weight. The binder may include some initiators or catalysts to polymerize fats or other initiators or catalysts to polymerize proteins. Structures formed using the binder may be made from naturally occurring agricultural products with the protein already in them, or in the alternative, the binder may be mixed with filler material and water from other sources.

15 Claims, 1 Drawing Sheet

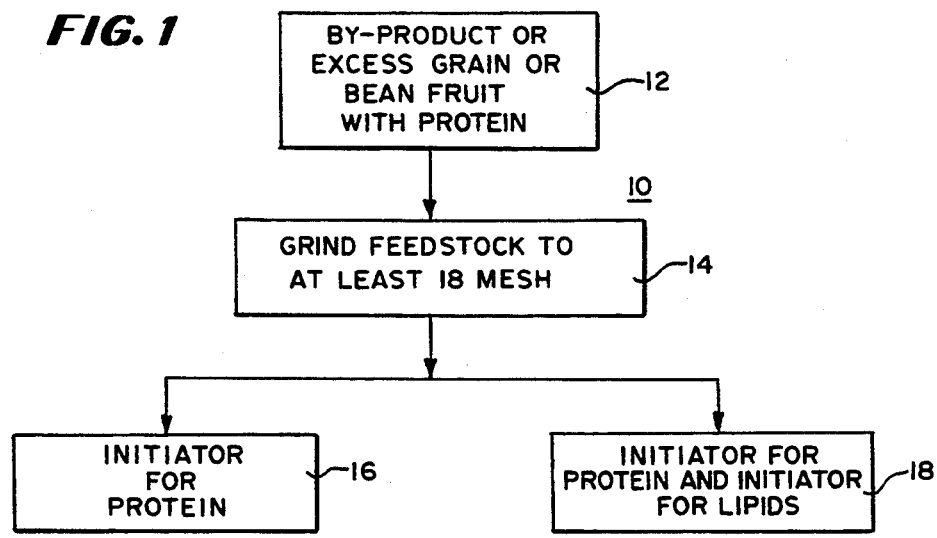
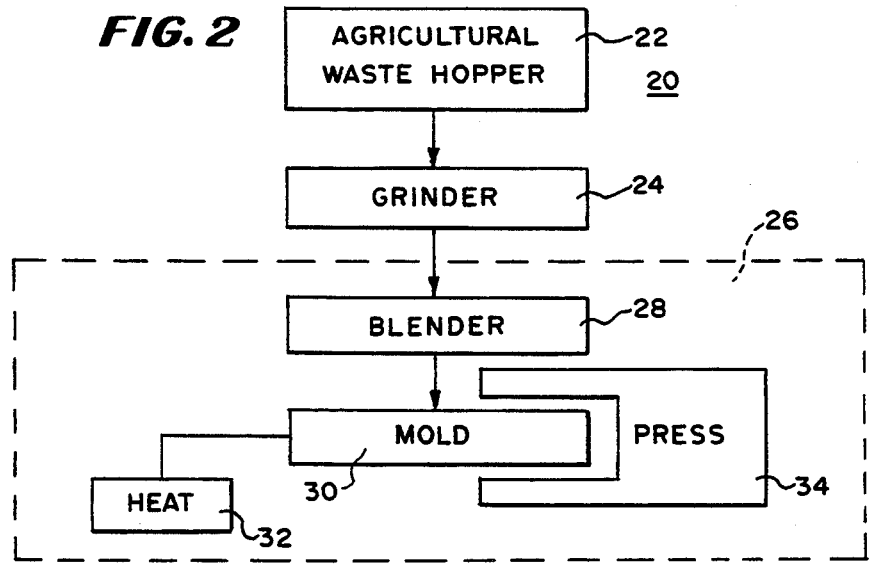
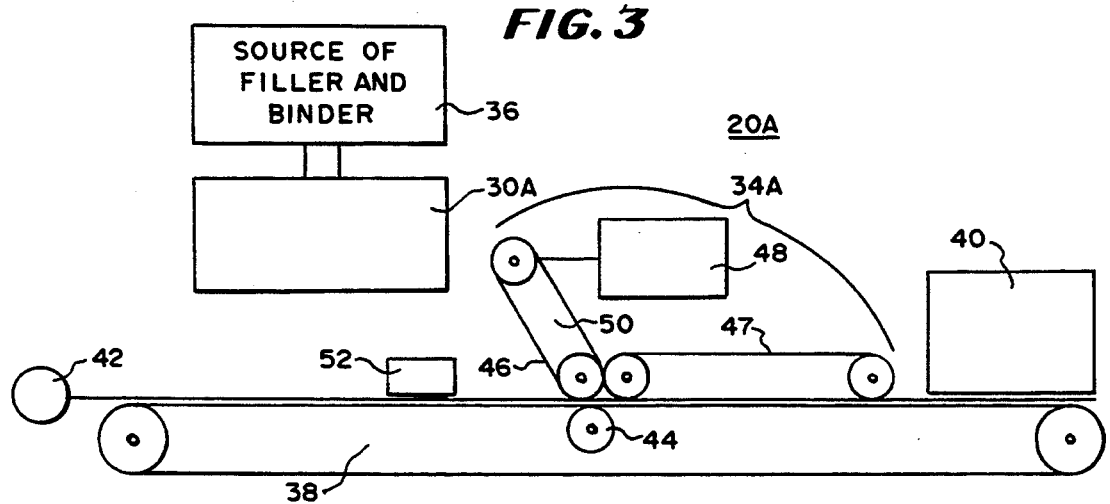

BINDERS, METHOD OF MAKING AND USING BINDERS AND STRUCTURES MADE USING BINDERS

This application is a continuation-in-part of application Ser. No. 07/659,458, filed Feb. 21, 1991, now abandoned, which is a continuation of U.S. application Ser. No. 07/503,135 filed Mar. 30, 1990, now abandoned, which is a continuation of application Ser. No. 07/378,429 filed Jul. 11, 1989, now abandoned, which is a continuation of U.S. application Ser. No. 07/144,663 filed Jan. 12, 1988, now abandoned, which is a continuation of application Ser. No. 06/712,518 filed Mar. 18, 1985, now abandoned.

BACKGROUND OF THE INVENTION

This invention relates to binders and structures made using binders.

In one class of binders, naturally occurring agricultural products are processed to remove materials usable as binders for either naturally occurring products or synthetic products. In one class of structure formed using binders, naturally occurring agricultural products are included as filler such as the case of composition board and other structures.

In a prior art type of binder of this class, the carbohydrates or lignin materials from the stalks or foliage of plants are removed from the plant and processed to form a binder. For example, in G. E. Hartford, "Production of Insulating Board from Cornstalks" *Industrial and Engineering Chemistry* v. 22, number 12, pp. 1280–1289, December 1930, it is suggested that pentosan sugars be removed from cornstalk pulp and used as adhesive.

It is also known to use agricultural materials or wood materials or materials processed from them: (1) to make structural members without adding a binder; (2) to use them as filler for composite structures such as composition board; and (3) to make larger structural members such as is the case with plywood. For example, in Boehm, Robert M. "The Masonite Process", *Industrial and Engineering Chemistry*, v. 22 number 5, pp. 493–497, (May 1930), a process is described in which wood fibers are exploded from the wood and then are formed into Masonite boards under pressure and steam without chemical additives.

These prior art binders, methods of making them, methods of using them and structures made with them have disadvantages in that they are relatively expensive because of the excessive processing necessary for their use. Moreover, many of the structures absorb excessive amounts of moisture and possess inadequate mechanical properties.

SUMMARY OF THE INVENTION

Accordingly, it is an object of the invention to provide an improved binder.

It is a further object of the invention to provide an improved method for forming binders.

It is a still further object of the invention to provide an improved composite structure formed with the aid of binders.

It is a still further object of the invention to provide an improved method of making structures using binders.

It is a still further object of the invention to provide an inexpensive binder made from waste materials such as stillage or the like.

It is a still further object of the invention to provide an improved composite board made of naturally occurring products with very little processing using binders already in the naturally occurring products.

It is a still further object of the invention to provide a particularly inexpensive composition board from agricultural products.

In accordance with the above and further objects of the invention, one embodiment of a binder includes naturally occurring plant proteins and carbohydrates, with the proteins having a thermoplastic microstructure with linear polymers of molecular weight of at least 2000 linked with peptide linkages of at least 50. The carbohydrates are at least 5% of the proteins by molecular weight. Additives may be incorporated to aid in the polymerization of the proteins.

In one embodiment, lipids are included and in this embodiment an initiator which causes polymerization of the lipids is also included. The initiators to cause the polymerization may include reactive arms. In this circumstance, the initiator may be selected to have arms of a length and type that improve both chemical and physical properties. Other reactive monomers may be included to aid in reacting the protein.

In another embodiment requiring higher temperatures and/or pressures, the binder relies principally upon naturally occurring plant lipids rather than protein and need not have significant protein. In this embodiment, the carbohydrates are at least five percent of the lipids by molecular weight.

In using the binder, structures are adhered together by penetration of the surface and polymerization and/or to some extent chemical reactions with the surfaces, particularly in the case of cellulose products, and/or by temporary alteration of the protein molecule structure to a form that engages the surface followed by another alteration to cause binding. Composition board may be made using the binder.

One form of composition board includes only naturally occurring agricultural products having protein from the germ seed and/or foliage and having filler from foliage, stems or the like from the same plant. There is in this embodiment a sufficient amount of protein for binding such as by polymerization through reactions of the peptide (or amide) and/or carboxyl groups.

In this embodiment, a pressure of at least 50 psi and 200 degrees Fahrenheit is applied for a sufficient time to alter the molecular structure such as by causing polymerization of the protein. No chemical additives are necessary but it is useful to include sufficient water to increase heat transfer for uniform temperature and to render the protein sufficiently flexible or mobile to come into intimate contact with and flow around the contours of surfaces to be bound together.

The time for application of pressure and heat must be long enough to permit temperature to become substantially uniform in the material and to cause reactions of the amide or carboxyl group. The exact value in some instances can be determined by experimentation, but is at least one second, and longer unless a non-conventional method of heat is used such as ultraviolet radiation.

To determine the desired density, a measured quantity of uncured material is subjected to different pressures until the proper density is achieved. The density is determined by any suitable method including those specified in ASTM standard ASTM D 1037-78 found in the 1981 Annual Book of ASTM Standards Part 22. Similarly, modulus of elasticity, modulus of rupture and percentage of thickness change with water absorption are determined by using samples and varying pressure, time and temperature and testing by ASTM D 1037-78 described above until the proper values are found.

In other embodiments, additives cause further polymerization by reacting with the proteins to a higher degree. Oxiranes having a molecular weight of between 50 and 1000 used without a solvent or oxiranes having a molecular weight of between 50 and 3000 used with a solvent are suitable for this purpose and react with the amine groups of the proteins. The binder may be formed either from whole grain or defatted grain, with the oils being used for other purposes or other by-products such as stillage from alcohol plants including the yeast. More generally it should include plant protein such as from the germ and/or endosperm of cereal grasses, oil seed plants or buckwheat seed or the seed of leguminous plants or from foliage of certain protein foliage plants or from Amaranthus or certain Xerophytic plants such as Partheium argentatum.

DESCRIPTION OF THE DRAWINGS

The above noted and other features of the invention will be better understood from the following detailed description when considered with reference to the accompanying drawings, in which:

FIG. 1 is a block diagram of a process for making binder;

FIG. 2 is a simplified schematic diagram of the process of using the binder; and FIG. 3 is another embodiment of the process of using the binder shown in FIG. 2.

DETAILED DESCRIPTION

Broadly, a binder includes naturally occurring proteins in agricultural products having a thermoplastic microstructure with linear polymers of molecular weight of a least 2000 linked with peptide linkages of at least 50 in number and including carbohydrates naturally occurring in the same agricultural product as the protein, with the carbohydrates being at least 5% of the protein by molecular weight. The mixture includes some lipids and the lipids vary depending on the source of the feedstock for the binder. In this specification, the words "molecular weight" mean "number average molecular weight".

In one embodiment, the binder contains substantial lipids as well as the proteins, and in this embodiment an initiator capable of causing reactions at the double bonds of the lipid upon the application of heat is mixed with the binder. In still another embodiment, either with an initiator for the lipids or without such an initiator and either with lipids present or without, compounds may be added which react with the amide and/or carboxyl groups of the proteins to form larger polymers or which serve as catalysts for such reactions such as to increase the degree of polymerization.

In still another embodiment, a binder includes naturally occurring lipids in agricultural products and may or may not have substantial protein but rely upon changes in the lipids for adhesion in use. This embodiment also includes carbohydrates naturally occurring in the same agricultural product as the protein, with the carbohydrates being at least five percent of the lipids by molecular weight.

Advantageously, the initiators or catalysts may be selected to react with the proteins or lipids at temperatures lower than those required for the initiators to react with carbohydrates and substantially the same as the temperatures necessary to make the proteins or lipids react among themselves to form larger polymers. In embodiments where the binder is being used to bind with solid surfaces rather than with a filler material to form composition board, the temperatures may be slightly different in order to permit a greater amount of chemical binding with the structures such as the cellulose of wood or the like while maintaining the polymerization action forming the bonds. In each of these cases, the initiators are added and maintained at a temperature lower than the temperature at which they react so that the reaction may be delayed until the binder is used.

In FIG. 1, there is shown a flow diagram 10 of a general process for making a binder including: (1) the step 12 of providing a source of by-product or excess grain or leaves containing protein as a feedstock; (2) the step 14 of grinding the feedstock to reduce its size to smaller than 18 mesh; and (3) either of two alternate steps 16 or 18. The step 16 is the step of adding a catalyst or reactive monomer for increasing the activity of the protein and the step 18 is the step of adding a catalyst or reactive monomer for crosslinking the protein and an initiator for polymerization of the lipids. The word "grain", in this application, is used in its general sense to include not only the seeds of cereal grasses or buckwheat but also the fruit of other plants which are leguminous such as beans.

While there are variations in the methods of making the binder, the general steps of the preferred embodiment are the same and they include first the step of obtaining the feedstock in adequate quantities and then grinding the feedstock after it has been obtained followed by either one of two steps depending on whether the feedstock has been defatted. If the feedstock has been defatted, then the process includes step 16 of adding an initiator, catalyst or reactive monomer for cross linking the protein, but if the feedstock has not been defatted, then additives, such as initiators, catalysts and reactive monomers are added for both the protein and for the lipids. The binder may then be packaged for later use.

The step 12 of obtaining a feedstock includes the step of obtaining any high protein agricultural product such as corn, sorghum or soybean which has within its germ or bean a protein capable of cross linking as a binder. While the grain or bean itself with all of its materials may be utilized, advantageously, the grain or bean may be used for other purposes first and the by-products used to make binder under some circumstances. For example, grains which have had the starch removed in the process of forming alcohol or defatted corn germ in which the oil has been sold as a by-product may be used to make binder.

For example, the fruit of the corn includes a germ portion which is high in one type of proteins and a storage portion with other proteins all encased in a cellulose portion. In the preferred embodiment, protein must be present but the lipids, the cellulose and the material resulting in ash if burned or some carbohydrates may be removed. In practice, the lipids may be used in other processes or removed for sale as a vegetable oil and in the case of stillage (a distillation waste), the germ may be spent leaving storage protein and lipids in the endosperm.

Prior to converting the feedstock into a binder, it should be ground to a consistency, the particle size of which readily blends to form a colloidal solution to provide better adherence to the members that are to be bound together. In its simplest form this is a grinding operation which reduces the feedstock to a size at least as low as 18 mesh and may be coupled with a straining or filtering operation as well as with dissolving type operations. In more complex formulations, collidol suspensions or emulsion may be used. The grinding may be by standard milling equipment or any other means suitable to create a consistency for the particular application. The binder must be finer for use as a binder for large pieces such as the formation of plywood than for composite board. The binder can be stored and when appropriate mixed with water and used.

Although protein binders do not require an initiator, they may be improved with an additive that enhances the cross linking mechanism. To form a binder principally of protein but including an additive, an additive which forms amide cured epoxys and polyamide is an especially desired additive and can be added but not permitted to react until the binder is in use. A suitable initiator is an oxirane, the activity of which is initiated by other forms of energy, such as light, or heat. In this specification, oxiranes means hydrocarbon molecules having oxirane (epoxide) groups and being generally linear or branched.

The oxirane used in this embodiment preferably has at least an oxirane group on the ends of each molecule to provide multiple connections to proteins and should have, if used without a solvent or without being emulsified in water, a molecular weight of between 50 and 1000. Higher molecular weight oxiranes such as up to 3000 may be used if dissolved or emulsified before being combined. Preferably, oxiranes within the molecular weight of 50 through 1000 are used without a solvent or without being emulsified. A suitable oxirane is sold by Shell Chemical Company, 1 Shell Plaza, Houston, Tex. 77002, under the designation Epon 828. Other suitable oxirane may be obtained from the same or other sources.

This type of reactive monomer causes cross linking with the free hydrogen in the peptide linkage of the protein. Other compounds with bifunctional groups on each end to react with the same hydrogen may be used and the longer the group, the less rigid the material is likely to be. However, the cross linking may be directly between peptide groups at the free hydrogen of the peptide group. Moreover, initiators or catalysts or monomers which react with the carboxyl and hydroxyl groups may also be used.

Another compound that has been found to work is hydantoin (glycolurea) sold by Ciba-Geigy Corporation, Dyestuffs and Chemicals Division, Greensboro, N.C. as C.G. SQ238. It is also known that resorcinol (3, hydroxyphenol or m-dehydroxybenzene) and certain isocynates, hindered isocynates and diisocynates are usable as cross-linking agents but they have not been tested. An additional list of potential chemicals that are known to be co-reactive for protein is discussed by John Bjorkoten in "Advances in Protein Chemistry," edited by M. L. Anson et al, Academic Press 1951, pp 343–381.

The maximum temperature of storage varies from formulation to formulation (depending on the quantity and type of catalyst, reactive monomer or initiator used) and with materials not having initiators, catalysts or reactive monomers and those that do. For binders not having an initiator, temperatures below 250 degrees Fahrenheit do not usually cause the binder to cross link and thus do not bind unless raised above the cross-linking temperature.

With initiators, reactive monomers and catalysts, storage temperature varies. It depends on the type and quantity used but preferably it should be less than 150 degrees Fahrenheit for protein additive and possibly less than 200 degrees Fahrenheit for lipid polymerization.

With initiators, reactive monomers and catalysts, the range is normally below 250 degrees Fahrenheit with the upper range being determined by the flash point of the particular additive, the threshold temperature for reactive monomers or by the half life of initiators used to cross link lipids. Storage life may also be extended, if reactants are selectively blended into two or more parts initially, which are then mixed prior to use. One part may be rich in protein, and the second being a monomer that reacts with the protein.

In addition to the ability to polymerize, the binder may have the ability to bind to the particles or members being attached by chemical reactions. The binder may attach by mechanical adhering or by permeation into the members to be bound because of its mobility as a lower molecular-weight protein and polymerization to a higher molecular weight to form a binder to hold the members. Thus, it may permeate into the members, and by polymerization, form a solid bond between the members. Additionally, a chemical reaction may take place between the binder and the material to be bound and the protein molecule may become altered in configuration with heat and plasticizers such as water permeate the surface and upon cooling become more dense and bind the surface.

Temperature alone may be the initiator of polymerization and nothing added to the protein. The basic met of the protein in the embryo is —(NHCHRCO—)n representing a structure of a polyamide or polypeptide. Thus the protein polymer length may be further increased by initiators and reactive monomers to form a binder but also at high temperatures may be denatured resulting into other reactive components such as glutamic acid, leucine, alanine, proline and tyrosine, each having different chemical branches, some saturated and some unsaturated.

At higher temperatures, some bonding may be made with cellulose of waste agricultural materials such as, for example, bonding between the glutamic acid and the cellulose to form an ester. Binding between cellulose and other materials and polymerization may both apply when reactive monomers, initiators or catalysts are used so that at high temperatures, the protein is denatured, and then the additive operates to polymerize some bonds while others are formed by the high temperature creating chemical bonding with the material.

Some initiators that have proved effective are: (1) dicumyl peroxide which is effective at 280 degrees Fahrenheit; and (2) Lupersol ((2,5 dimethyl, 2,5 (T-butylperoxy) hexane) at 300 degrees Fahrenheit, which are available from the Lucidol Division of Wallace and Tieman Inc., 1740 Military Road, Buffalo, N.Y. 14240. That organization also sells many other initiators, catalysts and reactive monomers such as peroxides. It is believed that peroxides are generally usable and compounds of this class are listed in Table 1 of the publication "Evaluation of Organic Peroxides From Half-Life Data" incorporated herein and available from the aforementioned Lucidol Division.

Some oil in a principally protein binder product may have a plasticising effect and uncontrolled amounts of the lipids may cause unpredictable modulus of elasticity, low and unpredictable strength and other unpredictable characteristics. Consequently, if lipids remain in the raw material, they should be polymerized to provide further binding and product stability.

Because the lipids or fats in the agricultural products are principally semi-dry oils, they must be chemically altered by initiators for effective polymerization. The initiators for this purpose are relatively expensive and so an economically synergistic process is to purchase defatted grain and utilize only the protein. This is economical because the oils are a valuable part of the grain and may readily be sold. Indeed, defatted grain is available on the market as a waste product, as well as from sources such as distillary grains from alcohol production which utilizes principally the starches of the grain, as processed meals from defatted soybeans, corn germ, peanuts, sunflowers or flax.

When the grain is not defatted, in addition to polymerizing the protein, the fats must be polymerized. This is done primarily by polymerization reactions which are: (1) chain-growth reactions of the vinyl groups on the oils using an initiator; (2) condensation protein transesterification reactions with the alcohol groups of cellulose; (3) step-growth amidization reactions with such protein units as lysine or arginine; or (4) step-growth esterification reactions with hydroxy-proline. Condensation polymerization is sometimes referred to as step-reaction or step-growth polymerization or reactions.

Many of the oils in plant germ are semi-drying oils such as, monoglycerides, diglycerides or triglycerides. The unsaturated oil is primarily composed of oleic with some linoleic acid. After hydrolysis, a carboxyl group is formed which permits polymerization or polymerizations may be transesterifications. An initiator may be used for the polymerization of the glycerides such as the peroxides mentioned above, including particularly Lupersol (2,5 dimethyl, 2,5 (T-butylperoxy) hexane)).

After formation of the binder, it is stored under conditions that prevent polymerization until use. Normally storing it at a cool temperature below the activity range of the additives or polymerization point of the protein in containers which shield it from light will permit a relatively long storage life. For ambient reactive chemical additives, formulations in two or more containers may be stored and blended at the time of the formation of the binder.

The binders may be used to: (1) form composition board of relatively small particles, a large number of which are bound together into the board; or (2) adhere a few large items together. For composition board, the filler may be of many types but in one special embodiment, the filler and the protein, with or without oil, are naturally occurring together such as in the case of corn germ and corn refuse such as cornstalks. In this embodiment, as the compression and temperature increase, polymerization of the protein and/or oils occurs to form a binder for the cornstalks and thus a composition board is formed. Other boards may be formed with separate binder and any natural or synthetic filler, with a binder being of any of the types described above such as only protein, protein with an initiator catalyst or reactive monomer and protein with or without these additives together with lipids using an initiator for polymerization. The binder is not higher than 30% of weight to the filler in composition board.

In FIG. 2, there is shown a simplified version of an apparatus 20 for forming structures using binder having an agricultural waste hopper 22, a grinding or milling apparatus 24 and a composition board forming apparatus 26. The agricultural waste hopper may include agricultural waste or any other filler. The grinder 24 prepares it to the consistency required for the molding operation 26. The binder, when added, may be combined with the filler in the forming apparatus 26. Agricultural waste which includes protein to be used as a binder may be prepared in the grinder without adding binder.

The forming apparatus 26 includes a blender 28, a molding apparatus 30, a source of heat 32 and a pressing apparatus 34. The blender 28 may not be needed where binder is not added but is already part of an agricultural product used as the filler and the heater 32 may be eliminated if pressure from the press 34 is adequate to generate sufficient heat to cause polymerization in the mold 30.

In operation, the agricultural or other waste in the agricultural waste hopper 22 is ground to the proper consistency in the grinder 24, and if a binder is to be used, the binder is mixed into it. Water is blended into it in a sufficient amount to provide heat transfer, and alter the protein with heat to increase binding upon drying. The mixture is then applied to the mold 30 which may be a die for a structural shape such as a sculptured item made on-by-one in a single mold or may be a continuous conveyor mold to form sheets such as is the case with some composition board.

In the mold 30, pressure and supplementary heat, if necessary, is applied to reach the temperature for polymerization of the protein. The higher of the temperatures for the polymerization of lipids or proteins is used in accordance with the nature of the binder and additive. The heat and water also increase the mobility of the protein and enable it to better form around the binding surfaces, Thus, when cooled and dried, the protein becomes vitrified and also binds to the surface via primary or secondary bonds.

EXAMPLES

The following non-limitative examples illustrate the invention.

GENERAL CONDITIONS

The samples of board were tested in each case using the methods specified in ASTM standard ASTM D 1037-78 found in the 1981 Annual Book of ASTM Standards Part 22. Testing was done at the University of Nebraska under the supervision of Dr. William Splinter, Professor and Head of Agricultural Engineering.

In some cases, the specimen being tested was not long enough to satisfy the length to thickness ratio needed to meet the ASTM specifications. With this type of specimen, a commercial board was tested using ASTM standards and then smaller sizes of the commercial board were tested which conformed in dimensions to the specimen. A comparison was used in such cases to provide guidelines to determine values.

In the description below, the units are in parts per weight, hours and degrees Fahrenheit. Unless otherwise specified, the curing temperature is 330 degrees Fahrenheit and the time for curing is 1.5 hours in an aluminum mold.

The percentage thickness change is a measure of water absorption and the thickness change is mentioned after soaking in water for 24 hours. No additives were added to seal the manufactured specimen.

EXAMPLE 1

One hundred parts of corn germ were ground to 18 mesh and mixed with 50 parts of water and 100 parts of corn fiber. A board was made and tested as described in the general procedures. The results are shown in Table 1.

EXAMPLE 2

Eighty parts of corn germ were ground to 18 mesh and mixed with 50 parts of water and 100 parts of corn fiber. A board was made and tested as described in the general procedures. The results are shown in Table 1.

TABLE 2

| | | | Effect of Increasing Oxirane Content On Mechanical Properties | | | | |
|---|---|---|---|---|---|---|---|
| Sawdust lb | Water lb | Germ lb | Oxirane lb | Elastic MOD(PSI) | Rupture MOD (psi) | Specific Gravity | % Thickness Change |
| 100 | 50 | 50 | 3 | 121,613 | 1,150 | 0.76 | 13.3 |
| 100 | 50 | 50 | 5 | 128,717 | 1,542 | 0.76 | 15.7 |
| 100 | 50 | 50 | 10 | 151,906 | 1,646 | 0.77 | 12.0 |
| 100 | 50 | 50 | 15 | 106,030 | 1,542 | 0.79 | 10.7 |
| 100 | 50 | 50 | 20 | 126,143 | 1,099 | 0.78 | 12.0 |

TABLE 1

| | | | Effect of Increasing Germ On Mechanical Properties | | | |
|---|---|---|---|---|---|---|
| Stover lb | Water lb | Germ lb | Elastic MOD (PSI) | Rupture MOD (PSI) | Specific Gravity | % Thickness Change |
| 100 | 50 | 100 | 86,129 | 894 | 0.76 | 36.4 |
| 100 | 50 | 80 | 86,401 | 760 | 0.73 | 32.8 |
| 100 | 50 | 60 | 82,441 | 910 | 0.76 | 44.3 |
| 100 | 50 | 50 | 60,457 | 751 | 0.75 | 31.0 |
| 100 | 50 | 40 | 69,454 | 803 | 0.76 | 25.0 |

EXAMPLE 3

Sixty parts of corn germ were ground to 18 mesh and mixed with 50 parts of water and 100 parts of corn fiber. A board was made and tested as described in the general procedures. The results are shown in Table 1.

EXAMPLE 4

Fifty parts of corn germ were ground to 18 mesh and mixed with 50 parts of water and 100 parts of corn fiber. A board was made and tested as described in the general procedures. The results are shown in Table 1.

EXAMPLE 5

Forty parts of corn germ were ground to 18 mesh and mixed with 50 parts of water and 100 parts of corn fiber. A board was made and tested as described in the general procedures. The results are shown in Table 1.

EXAMPLE 6

One hundred parts of fiber are combined with 50 parts of corn germ milled to at least 18 mesh and 50 parts of water together with 3 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 7

One hundred parts of fiber are combined with 50 parts of corn germ milled to at least 18 mesh and 50 parts of water together with 5 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 8

One hundred parts of fiber are combined with 50 parts of corn germ milled to at least 18 mesh and 50 parts of water together with 10 parts of oxiranne (epon 828). A board was made of the paste and it was cured at 330 degrees Fahrenheit for 1.5 hours. It was then tested for mechanical ability in accordance with the general testing procedures above and the results are shown in Table 2.

EXAMPLE 9

One hundred parts of fiber are combined with 50 parts of corn germ milled to at least 18 mesh and 50 parts of water together with 15 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 10

One hundred parts of fiber are combined with 50 parts of corn germ milled to at least 18 mesh and 50 parts of water together with 20 parts of oxirane (epon 828). A board was made of the paste and it was cured at 330 degrees Fahrenheit for 1.5 hours. It was then tested for mechanical ability in accordance with the general testing procedures above and the results are shown in Table 2.

EXAMPLE 11

One hundred parts of fiber combined with 50 parts of corn germ ground to at least 18 mills and 50 parts of water were mixed with 1 part of peroxide (Lupersol) and cured at 330 degrees Fahrenheit for 1.5 hours. The board made in this manner was tested and the results are shown in Table 3.

TABLE 3

| | | | | Optimization of Initiator | | | |
|---|---|---|---|---|---|---|---|
| Sawdust lb | Germ lb | Water lb | Initiator lb | Elastic MOD(PSI) | Rupture MOD(PSI) | Specific Gravity | % Thickness Change |
| 100 | 50 | 50 | 1 | 91,322 | 956 | 0.74 | 21.0 |
| 100 | 50 | 50 | 2 | 104,242 | 900 | 0.75 | 16.8 |

TABLE 3-continued

| | | | | Optimization of Initiator | | | |
|---|---|---|---|---|---|---|---|
| Sawdust lb | Germ lb | Water lb | Initiator lb | Elastic MOD(PSI) | Rupture MOD(PSI) | Specific Gravity | % Thickness Change |
| 100 | 50 | 50 | 3 | 94,447 | 1,050 | 0.73 | 18.8 |
| 100 | 50 | 50 | 4 | 61,022 | 745 | 0.74 | 19.3 |
| 100 | 50 | 50 | 6 | too soft | too soft | 0.75 | 19.0 |

EXAMPLE 12

One hundred parts of fiber combined with 50 parts of corn germ ground to at least 18 mills and 50 parts of water were mixed with 2 parts of peroxide (Lupersol) and cured at 330 degrees Fahrenheit for 1.5 hours. The board made in this manner was tested and the results are shown in Table 3.

EXAMPLE 13

One hundred parts of fiber combined with 50 parts of corn germ ground to at least 18 mills and 50 parts of water were mixed with 3 parts of peroxide (Lupersol) and cured at 330 degrees Fahrenheit for 1.5 hours. The board made in this manner was tested and the results are shown in Table 3.

EXAMPLE 14

One hundred parts of fiber combined with 50 parts of corn germ ground to at least 18 mills and 50 parts of water were mixed with 4 parts of peroxide (Lupersol) and cured at 330 degrees Fahrenheit for 1.5 hours. The board made in this manner was tested and the results are shown in Table 3.

EXAMPLE 15

One hundred parts of fiber combined with 50 parts of corn germ ground to at least 18 mills and 50 parts of water were mixed with 6 parts of peroxide (Lupersol) and cured at 330 degrees Fahrenheit for 1.5 hours. The board made in this manner was tested and the results are shown in Table 3.

EXAMPLE 16

One hundred parts of sawdust were mixed with 50 parts of corn germ and 50 parts of water and 10 parts of oxirane and 1 part of Lupersol and a board made according to this process was tested. The results are shown in Table 4.

EXAMPLE 17

One hundred parts of sawdust were mixed with 50 parts of corn germ and 50 parts of water and 10 parts of oxirane and 2 parts of Lupersol and a board made according to this process was tested. The results are shown in Table 4.

EXAMPLE 18

One hundred parts of sawdust were mixed with 50 parts of corn germ and 50 parts of water and 10 parts of oxirane and 3 parts of Lupersol and a board made according to this process was tested. The results are shown in Table 4.

EXAMPLE 19

One hundred parts of sawdust were mixed with 50 parts of corn germ and 50 parts of water and 10 parts of oxirane and 4 parts of Lupersol and a board made according to this process was tested. The results are shown in Table 4.

EXAMPLE 20

One hundred parts of sawdust were mixed with 50 parts of corn germ and 50 parts of water and 10 parts of oxirane and 5 parts of Lupersol and a board made according to this process was tested. The results are shown in Table 4.

EXAMPLE 21

A simulated mixture of a partly defatted corn germ was prepared by extracting protein and fat and mixing it to arrive at 100 parts sawdust, 50 parts of the defatted corn germ, 50 parts of water, 10 parts of the oxirane and no oil at all. A board was made and tested and the results are shown in Table 5.

EXAMPLE 22

A simulated mixture of a partly defatted corn germ was prepared by extracting protein and fat and mixing it to arrive at 100 parts sawdust, 50 parts of the defatted corn germ, 50 parts of water, 10 parts of the oxirane and 9.6 parts of oil. A board was made and tested and the results are shown in Table 5.

EXAMPLE 23

A simulated mixture of a partly defatted corn germ was prepared by extracting protein and fat and mixing it to arrive at 100 parts sawdust, 50 parts of the defatted corn germ, 50 parts of water, 10 parts of the oxirane and 20.0 parts of oil. A board was made and tested and the results are shown in Table 5.

TABLE 4

| | | | | | Simultaneous Polymerization of Oil and Protein | | | |
|---|---|---|---|---|---|---|---|---|
| Sawdust lb | Germ lb | Water lb | Oxirane lb | Initiator lb | Elastic MOD(PSI) | Rupture MOD(PSI) | Specific Gravity | % Thickness Change |
| 100 | 50 | 50 | 10 | 1 | 93,131 | 1,168 | 0.77 | 7.45 |
| 100 | 50 | 50 | 10 | 2 | 79,162 | 1,127 | 0.74 | 11.10 |
| 100 | 50 | 50 | 10 | 3 | 96,109 | 1,035 | 0.76 | 10.95 |
| 100 | 50 | 50 | 10 | 4 | 135,153 | 1,289 | 0.76 | 11.04 |
| 100 | 50 | 50 | 10 | 5 | 83,313 | 980 | 0.78 | 9.52 |

TABLE 5

Plasticizing Effect of Oil in Oxirane Cured Corn Germ Composite

| Sawdust lb | Defatted lb | Water lb | Oxirane lb | Oil lb | Elastic MOD(PSI) | Rupture MOD(PSI) | Specific Gravity | % Thickness Change |
|---|---|---|---|---|---|---|---|---|
| 100 | 50 | 50 | 10 | 0.0 | 199,451 | 2,375 | 0.77 | 12.0 |
| 100 | 50 | 50 | 10 | 9.6 | 151,906 | 1,646 | 0.77 | 12.9 |
| 100 | 50 | 50 | 10 | 20.0 | 139,183 | 1,485 | 0.77 | 9.5 |
| 100 | 50 | 50 | 10 | 40.0 | 97,429 | 916 | 0.77 | 9.5 |

EXAMPLE 24

A simulated mixture of a partly defatted corn germ was prepared by extracting protein and fat and mixing it to arrive at 100 parts sawdust, 50 parts of the defatted corn germ, 50 parts of water, 10 parts of the oxirane and 40.0 parts of oil. A board was made and tested and the results are shown in Table 5.

EXAMPLE 25

Thirty three parts of corn stillage were mixed with 100 parts of sawdust and 6 parts of oxirane (Ciba-Geigy (9138)) obtainable from Ciba-Geigy Corporation. The stillage had water within it. The boards had a specific gravity of 0.72 and were cured at a pressure of 200 PSI, a temperature of 325 degrees Fahrenheit for 45 minutes. Three samples were tested and they showed for the first sample a modulus of rupture of 1457 PSI and a modulus of elasticity of 886,788 PSI; for the second sample, a modulus of rupture of 518 PSI and a modulus of elasticity of 302,741 PSI; and for the third sample, a modulus of rupture of 1128 and a modulus of elasticity of 601,646. The level of deviation from sample to sample is probably related to inconsistency in mixing of filler and binder.

EXAMPLE 26

Thirty three parts of corn stillage were mixed with 100 parts of sawdust and 6 parts of oxirane (Epon (828). The stillage had water within it. The boards had a specific gravity of 0.7215 and were cured at a pressure of 200 PSI, a temperature of 325 degrees Fahrenheit for 45 minutes. Three samples were tested and they showed for the first sample a modulus of rupture of 1000 PSI and a modulus of elasticity of 678,792 PSI; for the second sample, a modulus of rupture of 410 PSI and a modulus of elasticity of 680,577 PSI; and for the third sample, a modulus of rupture of 796 and a modulus of elasticity of 463,550.

EXAMPLE 27

Thirty three parts of corn stillage were mixed with 100 parts of wood chips, 4 parts of oxirane (Epon (828)) The stillage had water within it. The boards had a specific gravity of 0.7215 and were cured at a pressure of 200 PSI, a temperature of 325 degrees Fahrenheit for 45 minutes. Three samples were tested and they showed for the first sample a modulus of rupture of 1032 PSI and a modulus of elasticity of 550,080 PSI; for the second sample, a modulus of rupture of 430 PSI and a modulus of elasticity of 225,205 PSI; and for the third sample, a modulus of rupture of 713 and a modulus of elasticity of 393,182.

EXAMPLE 28

Thirty three parts of corn stillage were mixed with 100 parts of wood chips, 2 parts of oxirane (Epon (828)). The stillage had water within it. The boards had a specific gravity of 0.7215 and were cured at a pressure of 200 PSI, a temperature of 325 degrees Fahrenheit for 45 minutes. Three samples were tested and they showed for the first sample a modulus of rupture of 345 PSI and a modulus of elasticity of 183,542 PSI; for the second sample, a modulus of rupture of 313 PSI and a modulus of elasticity of 139,355 PSI; and for the third sample, a modulus of rupture of 594 and a modulus of elasticity of 257,735.

EXAMPLE 29

Thirty three parts of corn stillage were mixed with 100 parts wood chips. The stillage had water within it. The boards had a specific gravity of 0.7022 and were cured at a pressure of 200 PSI, a temperature of 325 degrees Fahrenheit for 45 minutes. Three samples were tested and they showed for the first sample a modulus of rupture of 787 PSI and a modulus of elasticity of 483,853 PSI; for the second sample, a modulus of rupture of 525 PSI and a modulus of elasticity of 318,664 PSI; and for the third sample, a modulus of rupture of 330 and a modulus of elasticity of 192,778.

EXAMPLE 30

Thirty-three parts of milo stillage were mixed with 100 parts of wood chips, 4 parts of oxirane (Epon (828)) The stillage had water within it. The boards had a specific gravity of 0.73 and were cured at a pressure of 200 PSI, a temperature of 325 degrees Fahrenheit for 45 minutes. Three samples were tested and they showed for the first sample a modulus of rupture of 592 PSI and a modulus of elasticity; of 306,508 PSI; for the second sample, a modulus of rupture of 610 PSI and a modulus of elasticity of 339,853 PSI; and for the third sample, a modulus of rupture of 296 and a modulus of elasticity of 172,325.

EXAMPLE 31

Thirty-three parts of milo stillage were mixed with 100 parts of wood chips, 8 parts of oxirane (Ciba-Geigy (9138)) obtainable from Ciba-Geigy Corporation. The stillage had water within it. The boards had a specific gravity of 0.73 and were cured at a pressure of 200 PSI, a temperature of 325 degrees Fahrenheit for 45 minutes. Three samples were tested and they showed for the first sample a modulus of rupture of 727 PSI and a modulus of elasticity of 414,257 PSI; for the second sample, a modulus of rupture of 690 PSI and a modulus of elasticity of 391,991 PSI; and for the third sample, a modulus of rupture of 968 PSI and a modulus of elasticity of 446,867.

EXAMPLE 32

Thirty-three parts of milo stillage mash were mixed with 100 parts of wood chips, 8 parts of oxirane (Ciba-Geigy (9138)) obtainable from Ciba-Geigy Corporation. The stillage had water within it. The boards had a specific gravity of 0.715 and were cured at a pressure of 200 PSI, a temperature of 325 degrees Fahrenheit for 45 minutes. Three samples were tested and they showed for the first sample a modulus of rupture of 1034 PSI and a modulus of elasticity of 539,984 PSI; for the second sample, a modulus of rupture of 869 PSI and a modulus of elasticity of 476,859 PSI; and for the third sample, a modulus of rupture of 645 and a modulus of elasticity of 201,008.

EXAMPLE 33

Thirty-three parts of milled soybean were mixed with 100 parts of wood chips, 8 parts of oxirane (Ciba-Geigy (9138)) obtainable from Ciba-Geigy Corporation. Sixty-six parts of water was added to the blend. The boards had a specific gravity of 0.9522 and were cured at a pressure of 200 PSI, a temperature of 325 degrees Fahrenheit for 45 minutes. Three samples were tested and they showed for the first sample a modulus of rupture of 782 PSI and a modulus of elasticity of 245,725 PSI; for the second sample, a modulus of rupture of 750 PSI and a modulus of elasticity of 188,750 PSI; and for the third sample, a modulus of rupture of 710 and a modulus of elasticity of 188,404.

In FIG. 3, there is shown equipment 20A for forming composition board having a source 36 of material to be formed into the board which may include a binder and a filler. The apparatus also includes the mold 30A, a conveyor apparatus 38, a press 34A and a heat tunnel 40. This equipment is positioned so that the feedstock from the source 36 is applied to a mold 30A and from there on to the conveyor 38 which carries it underneath the mold 30A for applying pressure to enhance or articulate polymerization. The pressed board is then carried under a heat tunnel 40 which cures it and subsequently, cuts it into the appropriate lengths.

The mold 30A is for a continuous conveyor application and includes pressure rollers 44 and 46 with the roller 44 being positioned beneath the top run of the continuous belt of the conveyor 38 and the roller 46 being positioned above the top run of the continuous belt. The rollers 44 and 46 are compressed against each other and moved either by the conveyor 38 or by a separate motor 48 which may drive one of the rollers such as the roller 46 through another endless belt or chain 50.

The board, after passing between the two presses, is slightly released and then passes into the bite of the two endless belts 38 and 47, with the bottom run of the endless belt 47 and the top run of the conveyor 38 being positioned against each other to press against the board as it moves therebetween. A heater 52 is positioned immediately before the pressure rollers 44 and 46 to heat the board to a sufficient temperature so that the pressure created in the board by the pressure as it moves the rollers and the added heat from the heater 52 are sufficient to cause polymerization. The conveyor 38 can be of any conventional type utilizing an endless .PA belt and may be adapted to draw a holding fabric from a roll 42 to form a base for the board.

In forming articles, the binder operates in one of two different modes or in both modes at the same time. In one mode, it penetrates the surface and then polymerizes to establish bonds between the two surfaces, or in a second mode it encompasses the surfaces and forms bonds or forms chemical linkages with the surface. If the binder is principally a protein, step growth polymerization takes place at the peptide linkage but other reactions may occur with other compounds at the amide groups or at the carboxyl groups. Polymerization can be accomplished to some extent by heat and pressure but also may utilize catalysts or other reactants to bind at the peptide linkages. Oxirane additives have been found to be a superior additive to bind at the amine groups.

If substantial lipids form part of the binder, the saturated lipids are converted by catalysts or initiators to a more reactive form and the lipids are polymerized by forming chain linkages from lipid to lipid or directly reacting the lipids together. In the preferred embodiment this conversion is by initiators in an addition polymerization reaction sometimes called chain-reaction or chain growth polymerization. The temperature of the composition board or other structure is raised either by pressure or by pressure and added heat to reach the decomposition temperature of the initiator, if any, incorporated in the composite board; otherwise, it is raised to a level above 300 degrees Fahrenheit. When an initiator is used, the temperature will be at the threshold or decomposition temperature of the initiator which will differ from initiator to initiator but will be generally above 80 degrees Fahrenheit.

As can be understood from the above description, the binder of this invention has the advantages of being inexpensive and forming a relatively strong adhesive. The composition board has the advantages of being inexpensive and using waste materials. Moreover, a variety of composition boards can be formed depending on the raw materials available and the cost to be incurred in the composition board or other structural article.

Although a preferred embodiment of the invention has been described with some particularity, many modifications and variations of the preferred embodiment may be made without deviating from the invention. Therefore, it is to be understood that, within the scope of the appended claims, the invention may be practiced other than as specifically described.

What is claimed is:

1. A method of making a composition board comprising the steps of:
   grinding an agricultural product having within it substantial lipids until it is reduced in size to at least 18 mesh;
   mixing sufficient water with said ground agricultural product to increase thermoconductivity wherein the lipids more readily polymerize about other structures;
   adding an initiator which causes polymerization of the lipids by chain growth prior to molding the agricultural product;
   packing said agricultural product to a density of at least 0.4 grams per milliliter and a specific gravity of at least 0.4; and
   molding the agricultural product into a fixed shape under conditions which apply sufficient heat and pressure to increase the temperature of the agricultural product to a temperature of at least 250 degrees Fahrenheit while the ground agricultural product is on an endless belt wherein polymerization is initiated to form a continuous board.

2. A method of making a composition board comprising the steps of:
   grinding an agricultural product having within it a protein with linear polymers of molecular weight of at least 2000, linked with peptide linkages of at least 30 in number until it is reduced in size to at least 18 mesh;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

packing said agricultural product to a density of at least 0.4 grams per milliliter and a specific gravity of at least 0.4;

molding the agricultural product into a fixed shape under conditions which apply sufficient heat and pressure to initiate polymerization; and polymerizing said protein sufficiently to hold said agricultural product together.

3. A method of making a composition board comprising the steps of:

obtaining a naturally occurring agricultural product containing plant protein not processed to remove carbohydrates wherein the carbohydrates have a weight in the agricultural product which is at least 5% of the weight of the protein in the agricultural product;

grinding the agricultural product having within it a protein with linear polymers of molecular weight of at least 2000, linked with peptide linkages of at least 30 in number until it is reduced in size to at least 18 mesh;

mixing sufficient water and said ground agricultural product to increase heat transfer for uniform temperature and to render the protein sufficiently mobile to come into intimate contact with and flow around the contours of surfaces to be bound together wherein the protein is more readily polymerized about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

4. A method according to claim 3 wherein oxirane having a molecular weight between 50 and 1000 is added.

5. A method according to claim 3 in which the step of adding an oxirane includes adding an oxirane with at least two groups capable of reacting with an amine of the protein at least, one of the groups being an oxirane group before molding the product, wherein the oxirane has a molecular weight of between 1000 and 3000 and is dissolved in a reactive monomer.

6. A method of making a composition board comprising the steps of:

grinding at least a portion of an agricultural product until it is reduced in size to at least 18 mesh, wherein the agricultural product includes corn germ and corn fiber having within it a protein with linear polymers of molecular weight of at least 2000, linked with peptide linkages of at least 50 in number and the ratio of corn germ to corn fiber is in the range of 40 parts by weight of corn germ to 100 parts by weight of corn fiber and 100 parts by weight of corn germ to 100 parts by weight of corn fiber;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

packing said agricultural product to a density of at least 0.4 grams per milliliter and a specific gravity of at least 0.4;

molding the agricultural product into a fixed shape under conditions which apply sufficient heat and pressure to initiate polymerization; and polymerizing said protein sufficiently to hold said agricultural product together.

7. A method of making a composition board comprising the steps of:

grinding at least a portion of an agricultural product until it is reduced in size to at least 18 mesh, wherein the agricultural product includes corn stillage and corn fiber having within it a protein with linear polymers of molecular weight of at least 2000, linked with peptide linkages of at least 50 in number and the ratio of corn stillage to corn fiber is in the range of 33.3 parts by weight of corn stillage to 100 parts by weight of corn fiber and 100 parts by weight of corn stillage to 100 parts by weight of corn fiber;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

8. A method according to claim 7 wherein oxirane having a molecular weight between 50 and 1000 is added.

9. A method according to claim 7 further including adding an oxirane with at least two groups capable of reacting with an amine of the protein, one of the groups being an oxirane group before molding the product, wherein the oxirane has a molecular weight of between 1000 and 3000 and is dissolved in a reactive monomer.

10. A method of making a composition board comprising the steps of:

grinding at least a portion of an agricultural product until it is reduced in size to at least 18 mesh, wherein the agricultural product includes milo stillage and sawdust having within it a protein with linear polymers of molecular weight of at least 2000, linked with peptide linkages of at least 50 in number and the ratio of milo stillage to sawdust is in the range of 33.3 parts by weight of milo stillage to 100 parts by weight of sawdust and 100 parts by weight of milo stillage to 100 parts by weight of sawdust;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

11. A method of making a composition board comprising the steps of:

grinding at least a portion of an agricultural product until it is reduced in size to at least 18 mesh, wherein the agricultural product includes corn stillage and sawdust having within it a protein with linear polymers of molecular weight of at least 2000, linked with peptide linkages of at least 50 in number and the ratio of corn stillage to sawdust is in the range of 33.3 parts by weight of corn stillage to 100 parts by weight of sawdust and 100 parts by weight of corn stillage to 100 parts by weight of sawdust;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

12. A method of making a composition board comprising the steps of:

grinding at least a portion of an agricultural product until it is reduced in size to at least 18 mesh, wherein the agricultural product includes corn stillage and wood chips having within it a protein with linear polymers of molecular weight or at least 2000, linked with peptide linkages of at least 50 in number and the ratio of corn stillage to wood chips is in the range of 33.3 parts by weight of corn stillage to 100 parts by weight of wood chips and 100 parts by weight of corn stillage to 100 parts by weight of wood chips;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

13. A method of making a composition board comprising the steps of:

grinding at least a portion of an agricultural product until it is reduced in size to at least 18 mesh, wherein the agricultural product includes milo stillage and wood chips having within it a protein with linear polymers of molecular weight of at least 2000, linked with peptide linkages of at least 50 in number and the ratio of milo stillage to wood chips is in the range of 33.3 parts by weight of milo stillage to 100 parts by weight of wood chips and 100 parts by weight of milo stillage to 100 parts by weight of wood chips;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

14. A method of making a composition board comprising the steps of:

grinding at least a portion of an agricultural product until it is reduced in size to at least 18 mesh, wherein the agricultural product includes milo stillage and fiber having within it a protein with linear polymers of molecular weight of at least 2000, linked with peptide linkages of at least 50 in number and the ratio of milo stillage to fiber is in the range of 33.3 by weight of milo stillage to 100 parts by weight of fiber and 100 parts by weight of milo stillage to 100 parts by weight of fiber;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range or between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

15. A method of making a composition board comprising the steps of:

grinding at least a portion of an agricultural product until it is reduced in size to at least 18 mesh, wherein the agricultural product includes corn stillage and fiber having within it a protein with linear polymers of molecular weight of at least 2000, linked with peptide linkages of at least 50 in number and the ratio of corn stillage to fiber is in the range of 33.3 part by weight of corn stillage to 100 parts by weight of fiber and 100 parts by weight of corn stillage to 100 parts by weight of fiber;

mixing sufficient water and said ground agricultural product to increase heat transfer for uniform temperature and to render the protein sufficiently mobile to come into intimate contact with and flow around the contours of surfaces to be bound together wherein the protein more readily polymerizes about other structures;

adding a reactant that reacts with an amine group of the protein at a temperature in the range of between 80 degrees Fahrenheit and 500 degrees Fahrenheit prior to molding the product;

packing said agricultural product to a density of at least 0.4 grams per milliliter and a specific gravity of at least 0.4;

polymerizing said protein sufficiently to hold said product together; and molding the agricultural product into a fixed shape under conditions which create sufficient pressure and temperature to increase the temperature of the agricultural product to a temperature in a range of between 80 degrees Fahrenheit and 500 degrees Fahrenheit.

* * * * *